Dec. 18, 1923.
H. DOLLMAN
PIPE JOINT
Filed June 1, 1922
1,477,696
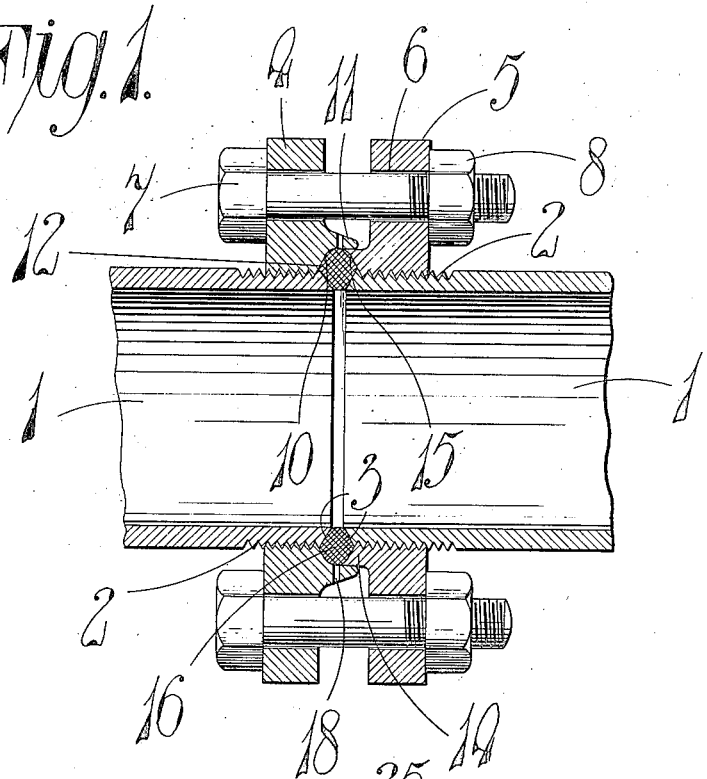
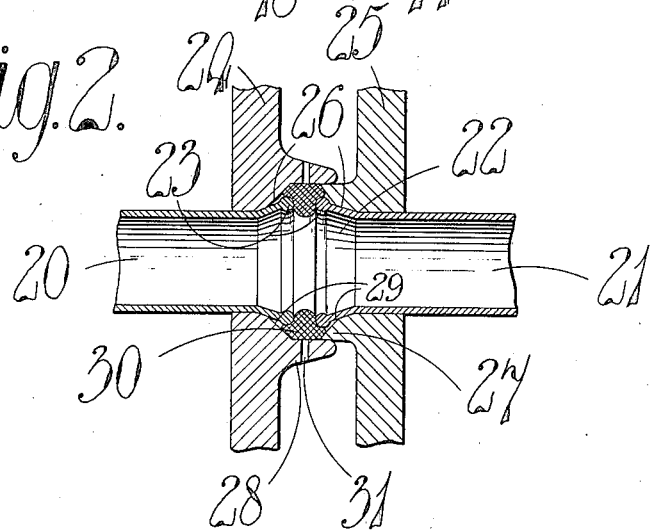

Patented Dec. 18, 1923.

1,477,696

UNITED STATES PATENT OFFICE.

HUBERT DOLLMAN, OF BIRMINGHAM, ENGLAND.

PIPE JOINT.

Application filed June 1, 1922. Serial No. 565,235.

*To all whom it may concern:*

Be it known that I, HUBERT DOLLMAN, a subject of the King of Great Britain, residing at 19 Anderton Park Road, Moseley, Birmingham, in the county of Warwick, England, have invented certain new and useful Improvements in Pipe Joints; and I do hereby declare the following to be a full, clear, and exact description of the same.

This invention relates to means for coupling together pipes and refers to that class of such employing non-metallic packing disposed between the ends of a pair of pipes and spigot and socket members thereon, said packing being contained and compressed in the socket member by the spigot member which is slidable therein. This invention has for its object to provide a generally improved construction.

In a joint according to this invention the packing is adapted to be compressed by inclined surfaces on the socket and spigot members when the latter is drawn into the former, and forced inwardly between the ends of the pipes which, or parts of which, project beyond the adjacent surfaces of said members.

In joints somwhat similar to the above but in which abutting members are employed instead of slidably engaging spigot and socket members a packing of circular section has been held or compressed in a substantially circular space formed by rounded grooves in the meeting faces of the abutting members and bevelled edges on the ends of the pipes, and it has been proposed to provide one of said members around its periphery with longitudinally projecting spaced tongues adapted to engage in corresponding spaces between tongues projecting longitudinally around the periphery of the other member.

Further, according to this invention, the socket member may be provided with radially disposed or other holes or slits for the purpose of enabling the packing to be temporarily held in place.

The spigot and socket members may be screwed upon the extremities of the pipes and adjustable lengthwise thereof.

The coupling members may be drawn together by bolts or their equivalents.

Referring to the drawings:—

Figure 1 is a longitudinal sectional view of one form of joint according to this invention.

Figure 2 is a similar view of another form.

In the construction illustrated at Figure 1 which shows a joint suitable for comparatively large pipes, the ends of the pipes 1 are screw threaded at 2 upon their exteriors and the end faces are bevelled at 3 to a suitable angle or curvature so that if the two pipes are placed end to end they will make contact at edges formed by the internal diameter, their external surfaces being spaced apart by reason of the bevelling.

The two coupling members 4—5 are made separately and screwed on to the ends of the pipes. Each coupling member is provided with holes 6 or other means for the accommodation of longitudinal securing members such as bolts 7 which are secured by means of nuts 8.

One coupling member 4 is provided upon one face with a socket like portion 10 formed by an annular flange 11. The inner end of this socket like portion is bevelled or made concave to a suitable angle or curvature at 12.

The other coupling member 5 is formed at its inner periphery upon one face with a spigot. This spigot may be formed by an annular flange 14, the outer end of which is bevelled or formed to a suitable concavity 15.

The bevelling or concaving of portions of the two coupling members in each case is in the opposite direction to the bevelling or concaving of the end of the pipe to which the coupling member is applied.

The spigot of the one coupling member is adapted to slide within the socket provided on the other coupling member.

A packing 16 of suitable non-metallic material is inserted in the cavity formed between the ends of the pipes and the ends of the socket and spigot members and the exterior of the socket member. This packing is preferably in the form of a ring of resilient or compressible material, and when the coupling members are drawn together the packing is compressed within this cavity and serves to prevent the fluid within the pipes from obtaining access to the screw threads upon the exterior of the pipes. It will be appreciated that as the joint is tightened up the packing is compressed by the inclined surfaces 12 forcing it downwardly against and between the projecting ends 15 of the pipes 1.

For holding a ring of packing material in position whilst the joint is being made the annular flange 11 forming the socket member may be provided with a number of spaced radial or other openings 18 through which wooden pegs or flexible members (not shown) may be passed, which pegs or members engage with the ring of packing to hold it in position.

My invention is also applicable as illustrated in Figure 2 to pipes wherein the coupling members instead of being screwed upon the exterior of the ends of the pipes are either secured thereon by brazing or other means or are simply placed thereon. In such a construction the adjacent ends of the pipes 20—21 are expanded into tapered form at 22 and their ends are preferably enlarged or beaded or thickened at 23. With such an arrangement the interior surfaces of the coupling members 24—25 are shaped at 26 to suit the exterior surfaces of the ends of the pipes and the coupling members are provided with a spigot part 27 and socket part 28 as hereinbefore described, the ends of which parts are bevelled at 29 as already described.

In such an arrangement the coupling members may either be drawn together by bolts or their equivalents, or a coupling nut may be employed.

In this case the packing 30 is compressed against the ends of the pipes by the inclined surfaces of the spigot and socket portions and thus serves to prevent fluid within the pipes from escaping into the space between the exterior of the pipes and the interior of the coupling members.

Again, in this construction as in that illustrated in Figure 1, openings 31 may be provided in the socket member through which suitable holding members may be passed to retain the ring of packing material in position.

The cross section of the packing of jointing material may be selected in accordance with the needs of the joint. I may, for instance, use a ring of jointing material which is circular in cross section, or the ring may be rectangular in cross section or it may be shaped to suit the cross section of the cavity into which it is to be placed.

In all constructions it will be observed that the packing of jointing material covers the whole area of the ends of the spigot and socket and also the whole area of the ends of the pipes.

What I claim then is:—

1. A pipe joint comprising two pipes having inclined ends, two flanged coupling members, one adjustably mounted on the end of each of said pipes, non-metallic packing disposed between said coupling members, an annular projection on one of said coupling members extending axially from the face of its flange and beyond the end of the pipe on which said coupling member is mounted and constituting a socket, this projection having holes communicating with the interior of the socket for the purpose of temporarily securing this packing in position, said socket having an inclined end face, an annular projection on the other coupling member constituting a spigot projecting axially from the end of the pipe on which this coupling member is mounted and adapted to slide within said socket portion, said spigot having an inclined end face, and means for drawing and securing said coupling members together while the packing is secured in position.

2. A pipe joint comprising two pipes having inclined ends, two flanged coupling members, one adjustably mounted on the end of each of said pipes, non-metallic packing disposed between said coupling members, an annular projection on one of said coupling members extending axially from the face of its flange and beyond the end of the pipe on which said coupling member is mounted and constituting a socket, this projection having holes communicating with the interior of the socket for the purpose of temporarily securing the packing in position, said socket having an inclined end face, an annular projection on the other coupling member constituting a spigot projecting axially from the end of the pipe on which this coupling member is mounted and adapted to slide within said socket portion, said spigot having an inclined end face, and means for drawing and securing said coupling members together, whereby the packing is held between the inclined ends of the pipes and inclined faces of the spigot and socket portions substantially as set forth.

3. A pipe joint comprising two pipes having screw-threaded exterior ends and inclined end faces, two flanged coupling members, one adjustably mounted on the end of each of said pipes, non-metallic packing disposed between said coupling members, an annular projection on one of said coupling members extending axially from the face of the flange and beyond the end of the pipe on which said coupling member is mounted and constituting a socket, this projection having holes communicating with the interior of the socket for the purpose of temporarily securing the packing in position, said socket having an inclined end face, an annular projection on the other coupling member constituting a spigot projecting axially from the end of the pipe on which this coupling member is mounted and adapted to slide within said socket portion, said spigot having an inclined end face, and means for drawing and securing said coupling members together whereby the packing is held between the inclined ends of the pipes and inclined faces of the spigot and socket portions substantially as set forth.

In witness whereof I affix my signature.

HUBERT DOLLMAN.